(12) United States Patent
Arai

(10) Patent No.: US 6,260,674 B1
(45) Date of Patent: Jul. 17, 2001

(54) FRICTION MATERIAL

(75) Inventor: Masao Arai, Saitama (JP)

(73) Assignees: Akebono Brake Industry Co., Ltd., Tokyo; Akebono Research and Development Centre Ltd., Hanyu, both of (JP)

( * ) Notice: Subject to any disclaimer, the term of this patent is extended or adjusted under 35 U.S.C. 154(b) by 0 days.

(21) Appl. No.: 09/267,652

(22) Filed: Mar. 15, 1999

(30) Foreign Application Priority Data

Mar. 16, 1996 (JP) .................................... 10-065512

(51) Int. Cl.$^7$ ...................................... F16D 69/00
(52) U.S. Cl. .................... 188/251 A; 188/251 R
(58) Field of Search ................. 188/251 R, 251 A; 623/152, 153, 154, 155, 156, 157, 158

(56) References Cited

U.S. PATENT DOCUMENTS

| 5,413,194 | * | 5/1995 | Kulis, Jr. et al. | ................ | 188/251 A |
| 5,515,950 | * | 5/1996 | Kwolek | ............................ | 188/251 A |
| 5,775,465 | * | 7/1998 | Lam et al. | ........................ | 188/251 A |
| 5,984,055 | * | 11/1999 | Strasser et al. | .................. | 188/251 A |
| 6,041,893 | * | 3/2000 | Ervens et al. | .................... | 188/251 A |

FOREIGN PATENT DOCUMENTS

| 0681116 | 11/1995 | (EP) . |
| 1392681 | 6/1965 | (FR) . |
| 09089016 | 3/1997 | (JP) . |
| WO 9738236 | 10/1997 | (WO) . |

* cited by examiner

*Primary Examiner*—Robert J. Oberleitner
*Assistant Examiner*—Thomas J. Williams
(74) *Attorney, Agent, or Firm*—Finnegan, Henderson, Farabow, Garrett & Dunner, L.L.P.

(57) ABSTRACT

A friction material contains a fibrous reinforcement, a binder, and a friction modifier. The binder content of the friction material on the back plate side is made to be larger than the binder content of the friction material on the friction surface side. The fibrous reinforcement content of the friction material on the back plate side is made to be smaller than the fibrous reinforcement content of the friction material on the friction surface side.

4 Claims, 3 Drawing Sheets

(a)

(b)

(c)

(d) THREE TIMES PRESSING

FRICTION MATERIAL

BACKGROUND OF THE INVENTION

1. Field of the Invention

The present invention relates to a friction material used in a brake, or the like, and particularly to a friction material in which the strength of protrusions acting to hold the friction material on a pressure plate can be made large.

The present application is based on Japanese Patent Application No. Hei. 10-65512, which is incorporated herein by reference.

2. Description of the Related Art

A friction material mainly used in a brake, or the like, generally contains, as compounding ingredients, a filler selected from various kinds of fillers, a fibrous reinforcement selected from various kinds of fibers, an abrasive, and a friction modifier such as graphite, metal powder, or the like, and further contains a resin selected from various kinds of resins as a binder for binding these components.

As the amount of resin in the mixture increases, both density and strength of the friction material after molding increase. However, the amount of resin is generally suppressed to be as small as in a range of from about 5% by weight to about 15% by weight because both moderate plasticity and the presence of pores are required in terms of friction performance.

On the other hand, when the friction material is used for a brake, a structure in which the friction material is held by means of adhesively bonding the friction material to a back plate, or the like, is formed as a brake pad. The structure is as shown in FIG. 4. Because the brake pad 1 has such a structure, an idea for holding the friction material 2 firmly is applied to the back plate 3. That is, a plurality of holes 5 are provided in the back plate. The friction material 2 is preformed so that protrusions 4 are formed in positions corresponding to those of the holes 5. The preformed friction material is put on the back plate and heat-molded. The friction material 2 is integrally bonded to the back plate in the condition that the protrusions 4 are fitted into the holes 5 of the back plate, so that the brake pad 1 is produced.

In this occasion, the rear surface of the friction material 2 is adhesively bonded to the back plate firmly to thereby attach the friction material 2 to the back plate.

As described above, to suppress generally the amount of resin in the friction material to be as small as in a range of from about 5% by weight to about 15% by weight is preferable in terms of friction performance. However, there is a tendency to reduce the density and strength of the protrusions 4 because components hardly-flow in the protrusions 4. Further, there is a tendency to reduce the density of friction material portions above the protrusions because of the influence of the reduction of the density and strength of the protrusions. That is, rough portions 6 are formed. There is a problem that it is difficult to provide a friction material having uniform density as a whole.

SUMMARY OF THE INVENTION

The present invention is designed to provide a friction material which is so sufficient in terms of friction performance that both moderate plasticity and the presence of pores are given to the friction material inclusive of a friction material having protrusions as in the aforementioned brake pad while the strength of the friction material is enhanced.

The inventor has discussed various solving means from the view point of the structure and quality of the friction material to solve the aforementioned problem. As a result, it has been found in terms of friction performance that the friction performance need be satisfied only on the friction surface side but the friction performance on the other, back plate side than the friction surface side need not be taken into account, that is, the amount of resin on the back plate side can be increased. The inventor has repeated experiments on the basis of the findings and has confirmed the aforementioned function. Thus, the present invention has been reached.

According to the present invention, there is provided a friction material containing a fibrous reinforcement, a binder, and a friction modifier. The binder content of the friction material on the back plate side is made to be larger than the binder content of the friction material on the friction surface side. And the fibrous reinforcement content of the friction material on the back plate side is made to be smaller than the fibrous reinforcement content of the friction material on the friction surface side.

Features and advantages of the invention will be evident from the following detailed description of the preferred embodiments described in conjunction with attached drawings.

DETAILED DESCRIPTION OF THE PREFERRED EMBODIMENTS

According to the present invention, a friction material contains a fibrous reinforcement, a binder resin, and a friction modifier. The binder content and fibrous reinforcement content of the friction material on the friction surface side to perform its function by friction are set to be smaller (in a range of from 5% by weight to 20% by weight) and larger (in a range of from 5% by weight to 50% by weight) respectively in order to make friction performance good. On the other hand, the binder content and fibrous reinforcement content of the friction material on the back plate side having no direct relation with friction are set to be larger (in a range of from 10% by weight to 50% by weight) and smaller (in a range of from 0% by weight to 20% by weight) respectively than those on the friction surface side in order to make strength, or the like, large.

By this measure, strength, or the like, can be made large on the back plate side of the friction material, so that mechanical strength of the friction material as a whole can be improved.

Figure 3:
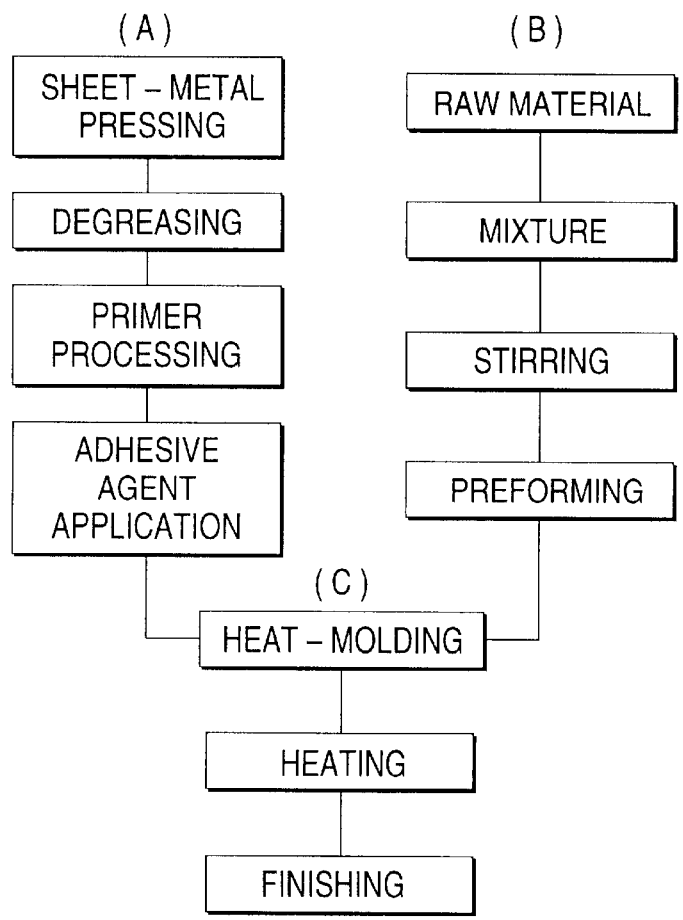
FIG. 3 shows a flow chart of the process of producing the friction material according to the present invention.
Figure 4:
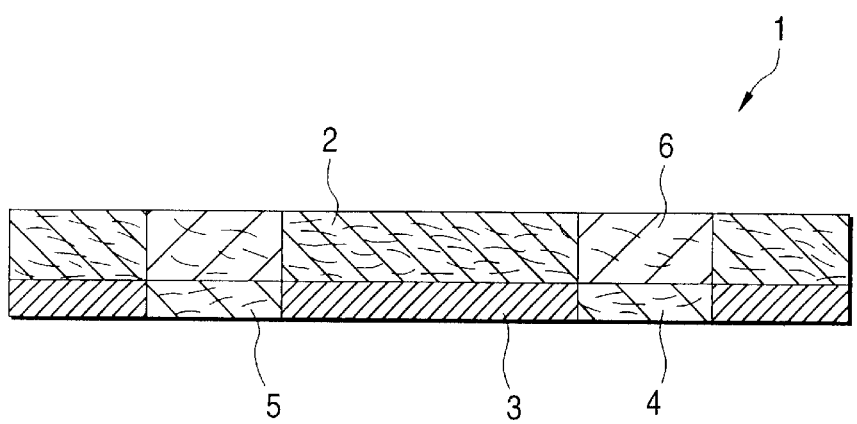
FIG. 4 shows a sectional view of a conventional friction material.

FIG. 3 shows a process which is performed conventionally, for example, for producing a disc brake pad. This producing process comprises: (A) a line for processing a back plate; (B) a line for preforming a friction material; and (C) a line for processing a product from the processed members obtained in (A) and (B) respectively.

This process is as follows. A back plate is molded to a predetermined shape by means of sheet metal pressing, subjected to degreasing and primer processing and coated with an adhesive agent. Fibrous reinforcement such as heat-resistant organic or inorganic fiber, metal fiber, or the like, is mixed with powder material such as an inorganic or organic filler, a friction modifier, a thermosetting resin binder, or the like. Then, the mixture is stirred to thereby prepare sufficiently homogeneous raw material. The raw material is preformed at a room temperature under a predetermined pressure to prepare a preform. The back plate and the preform are subjected to heat molding at a predetermined temperature under a predetermined pressure so that the backplate and the preform are integrally fixed with each other, and then subjected to heating (after curing). The cured matter is finally subjected to the finishing step.

Figure 2:
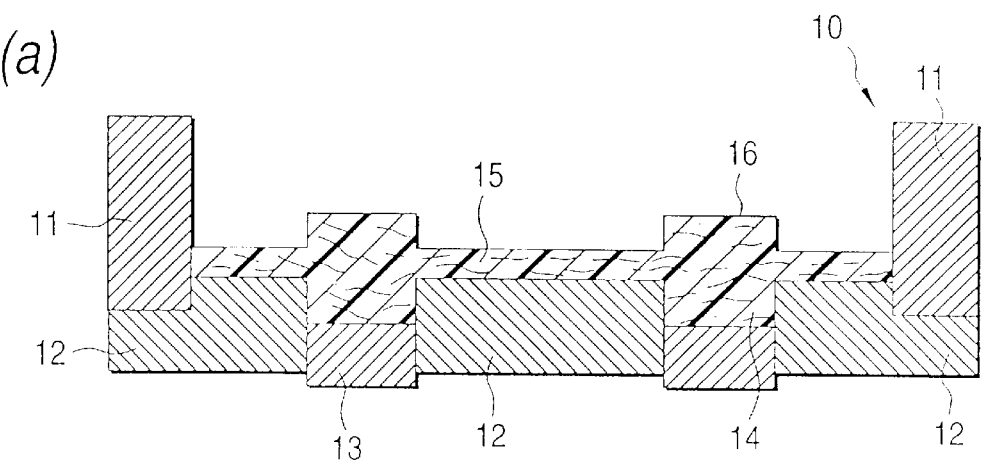
FIG. 2 shows a process of producing a preform of the friction material according to the present invention in order of stages.
Figure 2:
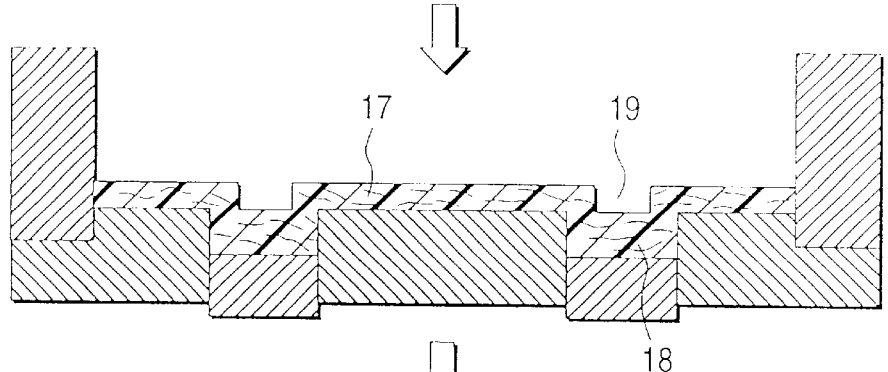
Figure 2:
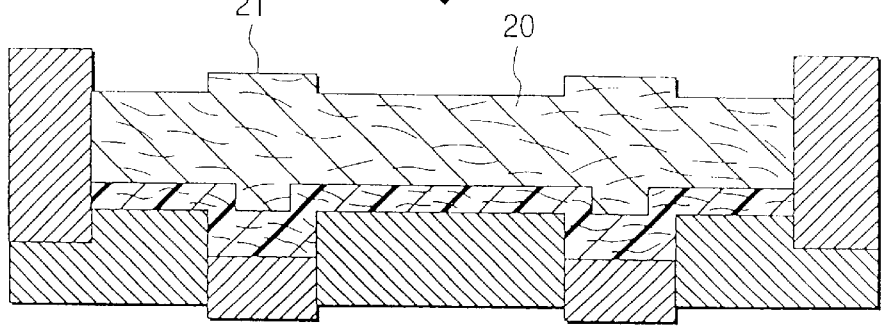
Figure 2:
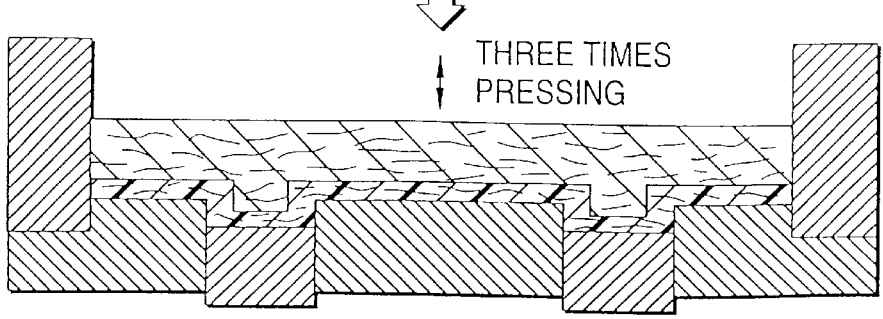

FIG. 2 is for explaining the process of producing a friction material according to the present invention in order of stages. FIG. 2 is equivalent to the portion of the preforming step in the producing process shown in FIG. 3. This step is separated into stages (a) to (d). The reference numeral 10 designates a mold combination as a whole; and 11, 12 and 13, molds respectively. The molds 13 are used for forming cavity portions 14 necessary for forming protrusions.

The stage (a) shows the condition in which a resin-rich mixture material 15 having a large amount of resin is packed in the mold combination. This mixture material may be packed as powder in the mold combination. However, because it is difficult to pack the mixture material with a uniform thickness, it may be rather convenient in terms of handling that the mixture material is slightly compressed in the form of a sheet so as to be carried easily. Further, the material portions above the molds 13 may be preferably provided as protrusive portions 16 having an amount which can compensate the depression of a resin-rich mixture material layer 17 to thereby prevent the upper surface of the resin-rich mixture material layer 17 from depressing.

The stage (b) shows the condition in which the mixture material is preformed by an upper mold after the stage (a). The resin-rich mixture material layer 17 thus molded has protrusions 18. Further, in the resin-rich mixture material layer 17, cavity portions 19 are formed above the protrusions 18 respectively. The cavity portions 19 are provided for reinforcing the connection between the resin-rich mixture material layer 17 and a conventional mixture material layer formed on the resin-rich mixture material layer 17. Accordingly, in the stage (a), a mold having protrusive portions for forming the cavity portions 19 is used as the upper mold.

The stage (c) shows the condition in which a conventional mixture material 20 is packed on the resin-rich mixture material layer 17 obtained in the aforementioned stage (b). A composition good in friction performance is selected as the composition of the conventional mixture material 20 so that pores can be formed.

The stage (d) shows the condition in which the conventional mixture material 20 packed in the aforementioned stage (c) is pressed so as to be preformed. The pressing operation is carried out by repeating pressing three times. Pressing is repeated three times for the purpose of making the density of the friction material uniform. The number of pressing is not limited to three times.

The preform obtained in the preforming step shown in the stages (a) to (d) is then heat-molded so that a friction material according to the present invention can be obtained.

Figure 1:
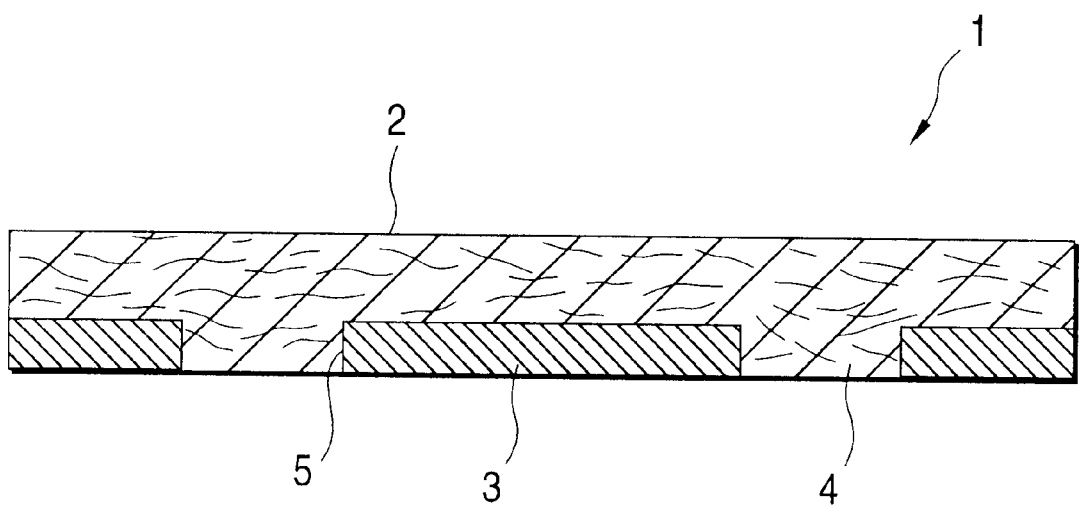
FIG. 1 shows a sectional view of a friction material according to the present invention.

The friction material obtained according to the present invention is not different from any conventional product in terms of external appearance. With respect to the inner structure of the friction material according to the present invention, as shown in the vertical sectional view of FIG. 1, the density of the protrusions 4 and portions above the protrusions 4 is little different from that of other portions. That is, the density of the protrusions 4 and portions above the protrusions 4 is substantially equal to other portions in the friction material.

Examples of the aforementioned heat-resistant organic fiber include aromatic polyamide fibers, and flame-resistant acrylic fibers. Examples of the inorganic fiber include ceramic fibers such as potassium titanate fiber, alumina fiber, etc., glass fibers, carbon fibers, rock wool fibers, and so on. Examples of the metal fiber include copper fibers, and steel fibers.

Examples of the inorganic filler include particles of metals such as copper, aluminum, zinc, etc., particles of flake-like inorganic substances such as vermiculite, mica, etc., and particles of barium sulfate, calcium carbonate, or the like. Examples of the organic filler include synthetic rubber, cashew resin, and so on.

Examples of the thermosetting resin binder include phenol resin (inclusive of straight phenol resin, and various kinds of phenol resins modified by rubber, or the like), melamine resin, epoxy resin, cyanic acid ester resin, and so on.

Examples of the friction modifier include metal oxides such as alumina, magnesia, zirconia, chrome oxide, quartz, etc., and so on. Examples of the solid lubricant include graphite, molybdenum disulfide, and so on.

The present invention will be described below specifically but the present invention is not limited thereto.

(1) First, a mixture material containing 30% by weight of resin larger than the resin content of the conventional mixture material, and a smaller amount of fiber than the fiber content of the conventional mixture material and containing no abrasive and no lubricant as shown in Table 1 was put into a mold combination for preforming a friction material.

(2) Then, the mixture material was pressed temporarily in order to make the protrusions dense.

(3) Then, an operation of pressing the mixture material as a whole vertically and stopping the pressing was repeated three times thus to obtain a preformed friction material. In this occasion, the operation of pressing and stopping the pressing was repeated three times for the purpose of making the density of the friction material uniform with respect to the upper and lower surfaces of the friction material.

(5) The preformed friction material was subjected to a heat-molding step in the same manner as in the conventional process. Thereafter, a finished product of the friction material was obtained via the steps of heating, polishing, etc.

Incidentally, materials used in Table 1 were as follows. Phenol resin was used as the binder. Barium sulfate was used as the filler. Aramid fiber was used as the fibrous reinforcement. Ceramic particles were used as the abrasive contained in the friction modifier. Graphite was used as the lubricant contained in the friction modifier. Further, other components were used.

On the other hand, in the aforementioned paragraph (5), the preform was pressed and heated so as to be heat-molded in the condition in which the preform was put on a coating surface of a back plate which was formed by means of sheet plate pressing, subjected to degreasing and primer processing and coated with an adhesive agent. The heat-molded matter was fed to the finishing step.

TABLE 1

Conventional Mixture and Resin-Rich Mixture (% by weight)

| Kind | Component | Resin-rich mixture (back plate side) | Conventional mixture (friction surface side) |
|---|---|---|---|
| Binder | Phenol resin | 30 | 7 |
| Filler | Barium sulfate | 55 | 42 |
| Fibrous Reinforcement | Aramid fiber, Titanate potassium fiber | 5 | 21 |
| Abrasive | Various kinds of ceramic particles | 0 | 14 |
| Lubricant | Graphite, etc. | 0 | 4 |
| Friction modifier | Rubber particles | 10 | 12 |

The friction performance of the friction material obtained according to the present invention in the aforementioned manner was as high as that of the conventional friction material. Furthermore, the protrusions of the friction material according to the present invention was hardened to have a hardness of from HRS 74 to HRS 82 whereas the hardness of the protrusions of the conventional friction material was from HRS 60 to HRS 76. Furthermore, the bending strength of the friction material according to the present invention was improved to be in a range of from 15 to 25 kgf whereas the bending strength of the conventional friction material was from 6 to 15 kgf. In addition, the density distribution of the friction material according to the present invention was uniform as a whole.

In the friction material according to the present invention, from the structure thereof, the friction performance on the friction surface side is good and the amount of resin and the amount of fibrous material in the binder are large and small respectively on the back plate side. Accordingly, the strength of the friction material is high on the back plate side. Accordingly, a friction material good in friction performance and high in strength as a whole is obtained.

Although the invention has been described in its preferred formed with a certain degree of particularity, it is understood that the present disclosure of the preferred form can be changed in the details of construction and in the combination and arrangement of parts without departing from the spirit and the scope of the invention as hereinafter claimed.

What is claimed is:

1. A friction material to be bonded on a back plate, comprising:
    a fibrous reinforcement;
    a binder; and
    a friction modifier,
    wherein a content of the binder on a side of the back plate is made to be larger than the content of the binder on a friction surface side of the friction material, and the content of the fibrous reinforcement on the side of the back plate is made to be smaller than the content of the fibrous reinforcement on the friction surface side of the friction material, wherein the fibrous reinforcement and the binder on the friction surface side of the friction material is the same as the fiber reinforcement and the binder on the back plate side of the friction material, wherein
    (i) the content of the binder is in a range of 5% by weight to 20% by weight and the content of the fibrous reinforcement is in a range of 5% by weight to 50% by weight on the friction surface side, and
    (ii) the content of the binder is in the range of 10% by weight to 50% by weight and the content of the fibrous reinforcement is in a range of 0% by weight to 20% by weight on the side of the backplate.

2. A friction material according to claim 1, wherein said friction material has at least one protrusion to be fitted into a hole of the back plate, and a density of the protrusions is substantially equal to a density of remaining portions of the friction material.

3. A friction pad comprising:
    a friction material; and
    a back plate on which said friction material is bonded,
    wherein said friction material contains:
        a fibrous reinforcement;
        a binder; and
        a friction modifier,
        wherein a content of the binder on a side of the back plate is made to be larger than the content of the binder on a friction surface side of the friction material, and the content of the fibrous reinforcement on the side of the back plate is made to be smaller than the content of the fibrous reinforcement on the friction surface side of the friction material, wherein the fibrous reinforcement and the binder on the friction surface side of the friction material is the same as the fiber reinforcement and the binder on the back plate side of the friction material, wherein
        (i) the content of the binder is in a range of 5% by weight to 20% by weight and the content of the fibrous reinforcement is in a range of 5% by weight to 50% by weight on the friction surface side, and
        (ii) the content of the binder is in the range of 10% by weight to 50% by weight and the content of the fibrous reinforcement is in a range of 0% by weight to 20% by weight on the side of the backplate.

4. A friction pad according to claim 3, wherein said friction material has at least one protrusion to be fitted into a hole of the back plate, and a density of the protrusions is substantially equal to a density of remaining portions of the friction material.

* * * * *

UNITED STATES PATENT AND TRADEMARK OFFICE
CERTIFICATE OF CORRECTION

PATENT NO.   : 6,260,674 B1
DATED        : July 17, 2001
INVENTOR(S)  : Masao Arai It is certified that error appears in the above-identified patent and that said Letters Patent is hereby corrected as shown below:

<u>Title page,</u>
Item [30], in the "Foreign Application Priority Data", "Mar. 16, 1996" should read -- Mar. 16, 1998 --.

Signed and Sealed this

Eleventh Day of June, 2002

*Attest:*

*Attesting Officer*

JAMES E. ROGAN
*Director of the United States Patent and Trademark Office*